Dec. 2, 1924.
G. MOTTE
ELECTRODE FOR ELECTRIC ARC WELDING
Filed Jan. 5, 1923
1,517,311
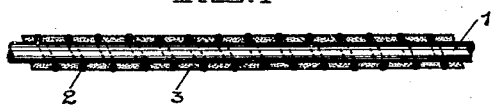
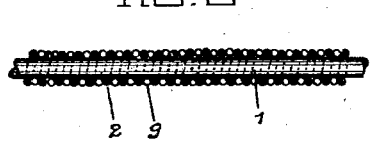
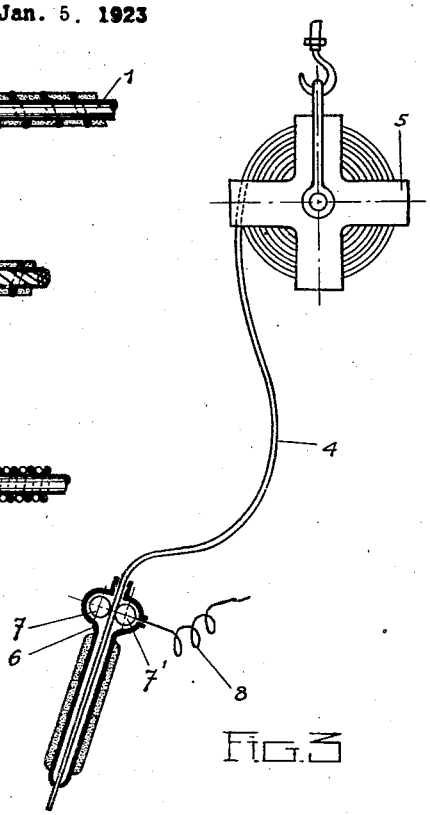
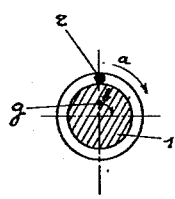
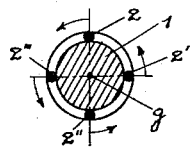
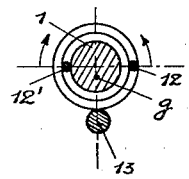
Inventor
G. Motte
by Langner, Parry, Card & Langner
Att'ys.

Patented Dec. 2, 1924.

1,517,311

UNITED STATES PATENT OFFICE.

GEORGES MOTTE, OF BRUSSELS, BELGIUM.

ELECTRODE FOR ELECTRIC-ARC WELDING.

Application filed January 5, 1923. Serial No. 610,877.

*To all whom it may concern:*

Be it known that I, GEORGES MOTTE, a subject of the King of Belgium, residing at Brussels, Belgium, have invented certain new and useful Improvements in or Relating to Electrodes for Electric-Arc Welding, of which the following is a specification.

This invention relates to electrodes used for electric arc welding. Hitherto these electrodes have usually consisted of a short length of wire or metal rod which when used is introduced into an electrode-holder having means whereby the electrode is connected to one of the poles of a suitable source of electric current. Some electrodes for this purpose are constituted by a metal core covered with a coating material, in which case, owing to the said coating material not being a conductor of electricity, the electrode always has one end left uncoated, the said end being intended to be introduced into the jaw or pincers of the electrode-holder. The use of such electrodes results in an interrupted or non-continuous process which, in addition to an appreciable loss of time in fixing each time a new electrode in the jaw or pincers, results in an appreciable waste of electrode material. It is obvious moveover, that the absence of continuity of the process has serious disadvantages from the point of view of the quality of the work and the homogeneousness of the welding.

The principal object of the present invention is to provide a continuous electrode capable of receiving its current outside throughout the whole of its length and therefore of being utilized for continuous welding by means of a simple electrode-holder whatever be the nature of the core constituting the electrode.

This result is obtained by surrounding the core of the electrode, of an undetermined length, with a helically wound metal band, wire or cable, the said helical metal band constituting an electric conductor, thus making it possible to use an electrode with a core which is a bad conductor or a non-conductor of electricity.

The present invention provides also for the case in which the continuous electrode is coated. In this case, the coating material is held between the spires of the said metal band, wire or cable.

The invention provides moreover certain arrangements owing to which it is possible to obtain, with an electrode constituted as hereinbefore described, various additional advantages such as automatic rotation of the arc or its blowing. This invention will now be described with reference to the accompanying drawings, and are more particularly specified in the appended claims.

In the said drawings,

Figure 1 is a longitudinal section of an electrode according to the invention.

Figure 2 is a similar section of a flexible electrode.

Figure 3 is a diagrammatic view showing how the coated electrode can be used in a continuous welding process.

Figure 4 is a cross-section of an electrode with a rotating arc.

Figure 5 is a similar section of another construction of electrode with rotating arc.

Figure 6 shows in longitudinal section a special electrode.

Figure 7 shows in cross-section another construction of electrode.

In the said figures, like parts are indicated by like reference numbers.

The electrode in Figure 1 comprises a core 1, about which is helically wound a wire 2 intended to conduct the current. The core 1 may be made of metallic or non-metallic material, and when a coating is present, it may be arranged, as shown at 3, between the spires formed by the metal winding 2.

Figure 2 shows a construction of a flexible electrode according to the invention. In the said figure, the core 1 of the electrode is constituted by a number of twisted or plaited wires or cables, about which is helically wound the wire 2. Several wires or strands, may be provided the windings of which form spires, between which can be arranged the coating material.

Figure 3 shows the manner of using the electrode according to the invention for continuous welding with a very simple electrode-holder. In the said figure, 4 is the continuous electrode wound on a reel 5. The electrode 4 passes into the electrode holder 6 in which it receives its current, through its outside metal winding, between rollers such as 7 and 7' to which is connected the conductor or wire 8. The rollers 7 and 7' may be rotated manually by any suitable device, or may be rotated by means of a small electric motor not shown in the drawings.

According to the invention, an electrode may be built, the arc of which, appearing between the same and the part to be treated, is rotated owing to the movement of the centre of gravity of the cross section of the electrode, the said circular movement being the result of the consumption of the electrode.

This result may be obtained by choosing a suitable ratio between the cross-section of the wire 2 surrounding the core 1, and the distance between the spires formed by winding the said wire. Figure 4 shows how during fusion, the consumption of the metallic elements constituting the electrode, takes place in a uniform manner and produces rotation of the section of the winding wire 2 about the section of the core 1 in the direction of the arrow $a$. It follows that the centre of gravity $g$ of the masses 1 and 2 also moves in the direction of the arrow $a$, the arc thus being given a movement of rotation about the centre of the geometrical figure of the core, the said movement of rotation being advantageous for the operation.

In order to keep the centre of gravity $g$ in the centre of the geometrical figure of the section of the electrode, whilst producing rotation of the arc, it is possible, as shown in Figure 6, to produce a balancing of the masses by winding and distributing evenly on the core of the electrode, two or more wires such as $2, 2', 2'', 2'''$, the sections of which move symmetrically about the electrode as it is being consumed.

In another type of electrode intended for welding, is provided, according to the invention, magnetic blowing of the arc produced, for the purpose of spreading out the arc and avoiding an excessive concentration in one point. In this case, on the metal core 1 of the electrode (wire or cable) is wound a wire 2, the spires of which are sufficiently close together to form a winding which takes part of the current and produces in the core of the electrode the desired magnetic flux. The wire 2 could be made of the same metal as the core, or of another metal or alloy of greater conductivity. Figure 6 illustrates a construction of electrode of this kind, in which the core 1 is surrounded by a close winding or wire 2, between the spires of which is arranged a second winding consisting of a wire 9 which is a non-conductor and constitutes the coating material.

When it is desired to deposit alloys by means of the electrodes according to the invention, the wire or wires which constitute the winding on the core of the electrodes, may be made of one or more metals different from that of which the core is made. In these conditions it may happen, on the one hand, that in order to obtain a given quality of alloy, with a metallic electrode core, it is necessary to use spires arranged comparatively close together, whilst on the other hand it is desired to avoid the flux produced by the passage of the current in the said spires. The invention provides therefore for the case in which the core of the electrode is covered with two wires wound in opposite directions. Figure 7 shows an arrangement of this kind, in which the two wires 12 and 12' are wound in opposite directions. It obviously follows that during the fusion, the arc follows the movements of the centre of gravity of the cross section of the masses. As already stated, the said movement or rotation of the arc may be an advantage in certain cases, but on the other hand in other cases it may be desirable to give the arc a definite direction. To this end, to the electrode may be added an additional mass 13 constituted for instance by a wire arranged at the back of the electrode. This additional wire 13 may be made of the same metal as, or of a metal or alloy different from, that or those of which the core is made.

It may be pointed out that the electrode constructions in Figures 4 and 5 may also be provided with an additional wire such as 13. The result of this arrangement is that the trajectory of the centre of gravity $g$ of the cross section of the masses, will be always situated between the center of the geometrical figure of the core 1, and the wire 13, and that therefore the arc will be always directed towards the wire 13.

It may also be pointed out that in the electrodes according to the invention, the core may be constituted by one or more wires of a material favourable to the working, the said core being then surrounded with a metal winding such as described.

Claims:

1. An electrode for electric welding, comprising, a metallic core of undetermined length, metallic windings surrounding the core, and a coating material arranged between the windings but not covering them.

2. An electrode for electric welding, comprising, a flexible metallic core of undetermined length, a helically wound metal wire surrounding the core, and a coating material arranged between the spires formed by the metal wire but not covering the wire.

3. An electrode for electric welding, comprising, a flexible metallic core of undetermined length consisting of a plurality of metal wires forming a stranded cable, metallic windings, surrounding the core, and a coating material arranged between the windings but not covering them.

4. An electrode for electric welding, comprising, a metallic core of undetermined length, a helically wound metal wire surrounding the core, and a wire of coating material wound between the spires formed by the metal wire.

5. An electrode for electric welding, comprising, a flexible metallic core of undetermined length consisting of a plurality of metal wires forming a stranded cable, a helical wound metal wire surrounding the cover, and a wire of coating material wound between the spires formed by the metal wire.

6. An electrode for electric welding, comprising, a metallic core of undetermined length, a plurality of metallic wires surrounding the core and helically wound and uniformly distributed on the core, and a coating material arranged between the spires formed by the metal wires but not covering the metal wires.

7. An electrode for electric welding, comprising, a metallic core of undetermined length, the core being surrounded by two windings of metal wire wound in opposite directions, and a coating material arranged between the windings but not covering them.

8. An electrode for electric welding, comprising, a metallic core of undetermined length, the core being surrounded by a winding of wire of a metal different from the core, a coating material arranged between the spires formed by the metal wire but not covering the latter.

9. An electrode for electric welding, comprising, a metallic core of undetermined length, the core being surrounded by a winding consisting of a plurality of wires of metal different from the core, and a coating material wound between the spires formed by the plurality of metal wires.

10. An electrode for electric welding, comprising, a metallic core of undetermined length, the core being surrounded by two windings of wires of metal different from the core, and wound in opposite directions on the core, and a coating material arranged between the windings, but not covering the same.

In testimony whereof I affix my signature.

GEORGES MOTTE.

Witnesses:
M. DEFRENNE,
LEONARD LEVA.